US010035134B2

(12) United States Patent
Dornhaus et al.

(10) Patent No.: US 10,035,134 B2
(45) Date of Patent: Jul. 31, 2018

(54) COATING SUSPENSION

(71) Applicant: UMICORE AG & CO. KG, Hanau-Wolfgang (DE)

(72) Inventors: Franz Dornhaus, Rodgau (DE); Michael Schiffer, Hanau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/506,459

(22) PCT Filed: Sep. 9, 2015

(86) PCT No.: PCT/EP2015/070574
§ 371 (c)(1),
(2) Date: Feb. 24, 2017

(87) PCT Pub. No.: WO2016/038074
PCT Pub. Date: Mar. 17, 2016

(65) Prior Publication Data
US 2017/0259248 A1    Sep. 14, 2017

(30) Foreign Application Priority Data
Sep. 10, 2014    (DE) .................... 10 2014 113 016

(51) Int. Cl.
*B01J 23/40* (2006.01)
*B01J 23/63* (2006.01)
*B01J 29/74* (2006.01)
*B01J 29/12* (2006.01)
*B01J 29/44* (2006.01)
*B01J 35/04* (2006.01)
*B01J 37/02* (2006.01)
*B01D 53/94* (2006.01)
*F01N 3/28* (2006.01)

(52) U.S. Cl.
CPC .......... *B01J 23/63* (2013.01); *B01D 53/9454* (2013.01); *B01J 29/126* (2013.01); *B01J 29/44* (2013.01); *B01J 29/7415* (2013.01); *B01J 35/04* (2013.01); *B01J 37/0215* (2013.01); *F01N 3/2842* (2013.01); *B01D 2255/1021* (2013.01); *B01D 2255/1023* (2013.01); *B01D 2255/1025* (2013.01); *B01D 2255/9155* (2013.01); *F01N 2510/063* (2013.01)

(58) Field of Classification Search
CPC ........ B01J 23/40; B01J 23/63; B01J 23/6562; B01J 29/126; B01J 29/44; B01J 29/7415; B01J 35/04; B01J 37/0215; B01D 2255/1021; B01D 2255/1023; B01D 2255/1025; B01D 2255/9155; F01N 3/2842; F01N 2510/063

USPC ..... 502/324, 329, 339; 106/1.05, 1.21, 1.28, 106/286.1, 286.6, 286.8
See application file for complete search history.

(56) References Cited

U.S. PATENT DOCUMENTS

| 3,274,284 | A | * | 9/1966 | Karkalits, Jr. | ............ C07C 5/56 585/618 |
| 3,295,918 | A | * | 1/1967 | Briggs | ................. B01D 53/944 423/213.5 |
| 5,164,351 | A | * | 11/1992 | Steinbach | ............ B01D 53/865 502/241 |
| 5,196,390 | A | | 3/1993 | Tauster et al. | |
| 5,296,435 | A | | 3/1994 | Kitaguchi et al. | |
| 6,887,445 | B2 | | 5/2005 | Braga et al. | |
| 2001/0043897 | A1 | | 11/2001 | Scranton | |
| 2002/0132724 | A1 | * | 9/2002 | Labarge | ................... B01J 23/34 502/64 |
| 2010/0152032 | A1 | | 6/2010 | Galligan | |
| 2011/0014099 | A1 | | 1/2011 | Dornhaus et al. | |
| 2017/0009623 | A1 | * | 1/2017 | Armitage | ............ B01J 37/0244 |

FOREIGN PATENT DOCUMENTS

| CN | 104801301 | A | * | 7/2015 | ............ B01J 23/656 |
| DE | 69733206 | T2 | | 2/2006 | |
| EP | 0505853 | A1 | | 9/1992 | |
| EP | 2275194 | A1 | | 1/2011 | |
| JP | 60064631 | A | * | 4/1985 | .............. B01J 23/89 |
| JP | 10043591 | A | * | 2/1998 | ............ B01J 23/656 |
| JP | 2001104781 | A | | 4/2001 | |
| JP | 2004/230223 | A | | 8/2004 | |
| WO | 2014/080220 | A1 | | 5/2014 | |
| WO | 2015/110819 | A1 | | 7/2015 | |

OTHER PUBLICATIONS

International Search Report PCT/EP2015/070574, dated Jan. 5, 2016 in English and German Language.
SAE Technical Paper Series 950809, Feb. 27-Mar. 2, 1995, pp. 121-130. Development of New Concept Three-Way Catalyst for Automotive Lean Burn Engines. N. Miyoshi, et al.
Wikipedia—Nickelgruppe (https://de.wikipedia.org/wiki/Nickelgruppe?oldid=123256410) (date not specified).
Wikipedia—Platinmetalle (https://de.wikipedia.org/wiki/Platinmetalle) (downloaded Aug. 27, 2015).
Written Opinion of the Internationals Searching Authority dated Mar. 17, 2016 for PCT/EP2015/070574 (24 pages—German with English machine translation).
International Preliminary Report on Patentability dated Mar. 14, 2017 for PCT/EP2015/070574 (26 pages—German with English machine translation).

* cited by examiner

*Primary Examiner* — Patricia L. Hailey
(74) *Attorney, Agent, or Firm* — Smith, Gambrell & Russell, LLP

(57) ABSTRACT

The invention relates to a coating suspension containing at least one platinum group metal on a support material, as well as manganese(II) carbonate, and to a method for coating a catalyst support substrate.

20 Claims, 1 Drawing Sheet

COATING SUSPENSION

The present invention relates to a suspension for coating catalytic converter substrates (washcoats), as well as a method for coating a catalyst support substrate.

In addition to particulate emissions, the exhaust gases of an internal combustion engine operated predominantly within the lean range contain, in particular, the primary emissions carbon monoxide CO, hydrocarbons NO, and nitrogen oxides NOx. Due to their relatively high oxygen content of up to 15 vol %, carbon monoxide and hydrocarbons can easily be rendered innocuous by oxidation, but reducing nitrogen oxides to nitrogen is much more difficult.

A known method of rendering nitrogen oxides from exhaust gases harmless in the presence of oxygen is to use nitrogen oxide storage catalytic converters, for which the terms 'lean NOx trap' or LNT are also customary. Their cleaning action is based upon the fact that, in a lean operating phase of the engine, the nitrogen oxides from the storage material in the storage catalytic converter are predominantly stored in the form of nitrates and broken down again in a subsequent rich operating phase of the engine, and the nitrogen oxides which are thereby released are converted with the reducing exhaust components in the storage catalytic converter to nitrogen, carbon dioxide, and water. This operating principle is described in, for example, the SAE document SAE 950809.

Possible storage materials include, in particular, the oxides, carbonates or hydroxides of magnesium, calcium, strontium, barium, the alkali metals, the rare-earth metals, or mixtures thereof. Due to their basicities, these compounds are able to react with the acidic nitrogen oxides in the exhaust gas to form nitrates and, in this way, store them. They are deposited with the greatest possible dispersion upon suitable substrate materials so as to create a large area of interaction with the exhaust gas. Furthermore, the nitrogen oxide storage catalytic converters usually contain precious metals such as platinum, palladium, and/or rhodium as catalytically active components. Their task is, on the one hand, to oxidize NO to $NO_2$, as well as CO and HC to $CO_2$, under lean conditions and, on the other hand, during rich operating phases, during which the nitrogen oxide storage catalytic converter is regenerated, to reduce the $NO_2$ released to nitrogen.

However, storage materials for nitrogen oxides also react with other acidic oxides in the exhaust gas. The particular problem here is that the sulfur dioxide arising from sulfur components in the fuel oxidizes in the precious metal catalytic converter to form sulfur trioxide and is adsorbed by the storage material as sulfate. Since sulfur trioxide has significantly more acidic properties than nitrogen oxides, when barium, for example, is used as the storage material, the formation of barium sulfate is preferred to the formation of barium nitrate.

Although modern diesel fuels have a low sulfur content, the nitrogen oxide storage catalytic converter nevertheless needs to be desulfurized from time to time. Considerable quantities of hydrogen sulfide are normally the result, which should not be released into the environment—not least on account of its unpleasant odor.

This can be remedied by so-called hydrogen sulfide blocking catalytic converters which can be installed downstream of the nitrogen oxide storage catalytic converter on an additional substrate in the undertray. It is, however, clearly preferable to install the hydrogen sulfide blocking catalytic converter on a substrate which is already present anyway—for example, on a diesel particulate filter.

Considerable cost and installation space savings can be achieved by integrating the blocking function in the diesel particulate filter. A practicable integration does, however, require that the dynamic pressure in the filter remain within the range normal for conventional filter coatings and that the secondary emissions arising during active filter regeneration not rise above an acceptable level. Furthermore, the blocking function must, of course, be permanently unaffected by periodic active filter regeneration. The component should advantageously have a significant HC/CO conversion performance.

A particulate filter of this kind with a hydrogen sulfide blocking function has already been described in EP 2 275 194 A1. It comprises an oxidation-active catalytic coating, which contains at least one catalytically active platinum group metal, as well as a copper compound—in particular, copper oxide—which handles the hydrogen sulfide blocking function. Since copper acts as a catalyst poison for the platinum metal group, the two of them are applied to the filter body in separate coatings.

U.S. Pat. No. 6,887,445 describes the cleaning of gases and liquids which are contaminated with sulfurous compounds by means of an oxide product which is an iron oxide or zinc oxide product. The latter is activated by an activator which can be not only one of a wide range of compounds, but also, for example, platinum oxide, palladium oxide, or a manganese compound, including manganese carbonate.

A three-way catalyst is known from U.S. Pat. No. 5,196,390 which is present in the form of a coating on a substrate, wherein a further coating for suppressing hydrogen sulfide emissions is located between the first-mentioned coating and the substrate. The second-mentioned coating contains a metal oxide which is selected from the group consisting of manganese oxide, nickel oxide, and iron oxide.

The use of manganese oxide ($MnO_2$) for controlling hydrogen sulfide emissions is also known from WO2014/080220. In this case, manganese oxide and precious metal are applied in a single coating to the filter substrate, wherein the washcoat used for coating also contains manganese oxide.

However, manganese oxide has properties which make processing unpleasant or costly. During processing, and particularly when the washcoat is being ground up, a 'greasy' film of brownish-black manganese oxide forms on all surfaces which come in contact with the washcoat. This means that considerable cleaning is required when the product is changed. Furthermore, manganese, although considerably weaker than copper in this respect, but nevertheless still significant, can also lead to a deterioration in the catalytic performance of the precious metal components of the washcoat, especially after aging.

The object of the present invention was, therefore, to provide a coating suspension (washcoat) with which catalyst support substrates can in the simplest possible way be coated with an oxidation and a hydrogen sulfide blocking function and wherein, in particular, the problems described above do not occur.

There came the surprising discovery that this aim was achieved by using manganese oxide ($MnO_2$) for the hydrogen sulfide blocking function, but using a coating suspension (washcoat) containing manganese(II) carbonate for coating the catalyst support substrate. During the drying and calcination processes following the coating operation, this is converted into manganese oxide, The present invention thus relates to a coating suspension containing at least one platinum group metal on a support material and manganese(II) carbonate.

The platinum group metals include the 'heavy platinum metals' osmium, iridium, and platinum, as well as the 'light platinum metals' ruthenium, rhodium, and palladium, The platinum group, which comprises nickel, palladium, and platinum only, is to be distinguished from the platinum group metals. Platinum group metals, which are used in the coating suspension according to the invention, are, in particular, platinum, palladium, and rhodium.

Embodiments of the coating suspension according to the invention contain platinum and palladium, or platinum alone.

When they contain platinum and palladium, the platinum to palladium ratio is, in particular, 15:1 to 1:5, preferably 12:1 to 1:2 and particularly preferably 6:1 to 1:1—for example, 5:1, 4:1, 3:1, or 2:1.

The total amount of platinum group metal is, in particular, 0.035 to 1.24 kg/m$^3$ (at 0.035 to 1.24 g/L (corresponds to approx. 1 to 35 g/ft$^3$)), with respect to the volume of the catalytic converter substrate.

Possible support materials for the platinum group metals are, in particular, the high surface area, high melting point oxides which are normally used. These preferably are aluminum oxide, rare-earth doped aluminum oxide, silicon dioxide, titanium dioxide, cerium oxide, but also mixed oxides such as aluminum-silicon mixed oxides, cerium-zirconium mixed oxides, and rare-earth doped cerium-zirconium mixed oxides.

In embodiments of the present invention, aluminum oxide is used as support material for the platinum group metals, especially, such as is stabilized by 1 to 6 wt %—in particular, 3 to 4 wt % lanthanum oxide ($La_2O_3$).

Manganese(II) carbonate is preferred in quantities of 3 to 20 kg/m$^3$ (from 3 to 20 g/l), and particularly preferred in 8 to 15 kg/m$^3$ (8 to 15 g/l), with respect to the volume of the catalyst support substrate.

In relation to the dry weight of the washcoat, manganese (II) carbonate is used in quantities of 10 to 85 wt %—in particular, 60 to 70 wt %.

In embodiments of the present invention, the coating suspension according to the invention does not contain any iron compounds—in particular, no iron oxide and no iron hydroxide.

In embodiments of the present invention, the coating suspension according to the invention can contain one or more zeolite compounds. These are, in particular, selected from the group consisting of zeolite β (zeolite beta), zeolite Y, ZSM-5, and mixtures of two or more of these.

When zeolite compounds are used, they will be present in quantities of 3 to 20 kg/m$^3$ (from 3 to 20 g/l) with respect to the volume of the catalytic converter support substrate.

The coating suspension according to the invention can be simply produced by mixing the desired quantities of manganese(II) carbonate and a support material containing at least one platinum group metal into an aqueous medium by stirring, If necessary, the desired weight ratio of support material and manganese(II) carbonate can be set by using uncoated support material in addition to the support material coated with platinum group metal. Moreover, one or more zeolite compounds can also be mixed in in the desired quantity.

Alternatively, the support material can also be present in the aqueous medium, and the at least one platinum group metal be added in a first step by the injection method. In a second step, manganese(II) carbonate and, if applicable, other ingredients as described above are then added.

Preferably, the procedure is carried out in such a way as to keep the pH value of the suspension at all times within the range of >5, and, in particular, of 6 to 8.

It is common practice to submit the coating suspension to a grinding process in order to obtain a grain size suitable for coating a catalyst support substrate, If a wall-flow filter substrate is to be coated, grinding will normally be to a $d_{99}$ value of <7 μm.

The coating suspension according to the invention makes it possible to coat catalyst support substrates in a single step, not only with a hydrogen sulfide blocking function, but also with an oxidation function.

The present invention, therefore, also relates to a method of coating a catalyst support substrate with a coating which includes a hydrogen sulfide blocking function and an oxidation function, characterized in that the catalyst support substrate is brought into contact with a coating suspension according to the invention, and then dried and calcined.

Preferably, the catalyst support substrate is brought into contact with a coating suspension according to the invention by means of one of the usual dip-coating methods or pump- and vacuum-coating methods. These methods are sufficiently known from the prior art.

The coating suspension according to the invention makes it possible, in particular, to apply the aforementioned functionalities to the catalyst support substrate in a single coating step.

Suitable as catalyst support substrates are basically all known catalytically inert support bodies for heterogeneous catalysts. Monolithic through-flow honeycomb structures made of ceramic or metal are preferred, as well as, in particular, particulate filter substrates such as are commonly used for cleaning diesel engine exhaust gases. Most preferable are ceramic through-flow honeycomb structures and ceramic wall-flow filter substrates made of cordierite, aluminum titanate, or silicon carbide.

The coating method according to the invention is simple and, in comparison to the use of washcoats containing $MnO_2$, is characterized by a marked improvement in cleaning behavior. In addition, the use of the coating suspension according to the invention results in an unexpected improvement in hydrogen sulfide performance after aging as compared with washcoats containing $MnO_2$.

The invention is explained in more detail by means of figures and examples below:

EXAMPLE 1

Figure 1:
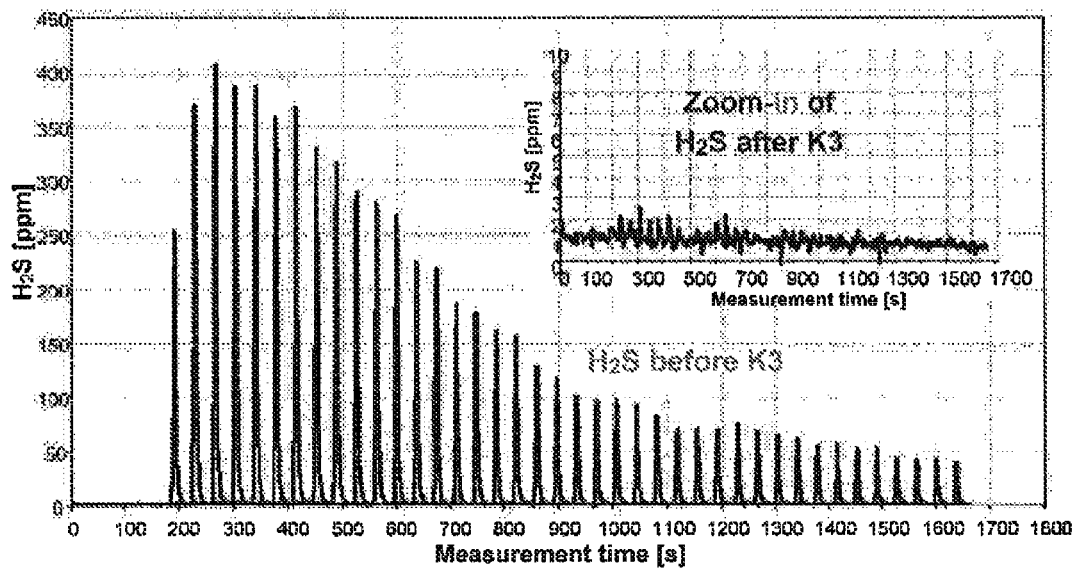
FIG. 1 shows the results of a test in which the effectiveness of filter K3 as a hydrogen sulfide blocking catalytic converter, said filter being coated with a coating suspension according to the invention, was investigated.

(a) In order to prepare a coating suspension according to the invention, a suspension in water of 15 kg/m$^3$ (15 g/L) (with respect to the volume of the wall-flow filter substrate to be coated (see step (b)) of a γ-aluminum oxide stabilized with 4% $La_2O_3$ was created by constant stirring and coated by the injection method with 0.176 kg/m$^3$ (5 g/ft$^3$) (with respect to the volume of the wall-flow filter substrate to be coated (see step (b)) of platinum and palladium in a 2:1 ratio. In the next step, 9.5 kg/m$^3$ (9.5 g/L) (with respect to the volume of the wall-flow filter substrate to be coated (see step (b)) of powdered manganese(II) carbonate was added and the mixture ground in a ball mill until a $D_{99}$ value of <5 μm was reached. (b) A commercially available wall-flow filter substrate made of silicon carbide was coated with the coating suspension obtained in step (a). Here, the filter substrate was oriented such that the flow ducts were perpendicular. The suspension was then pumped into the substrate via the lower end face. After a short interval, the excess suspension was suctioned downwards. With this method, the coating was substantially introduced into the pores of the substrate walls. The coating step was not repeated.

The filter was then dried and calcined at 550° C. The fully-coated and calcined wall-flow filter substrate no longer contains any manganese(II) carbonate, but only manganese oxide.

EXAMPLE 2

In order to prepare a coating suspension according to the invention, a suspension in water of 8 kg/m³ (8 g/L) (with respect to the volume of the wall-flow filter substrate to be coated (see step (b)) of a γ-aluminum oxide stabilized with 4% $La_2O_3$, which was coated with 0.7 kg/m³ (20 g/ft³) (with respect to the volume of the wall-flow filter substrate to be coated (see step (b)) of platinum and palladium in a 2:1 ratio, and 4 kg/m³ (4 g/L) (with respect to the volume of the wall-flow filter substrate to be coated (see step (b)) of the identical γ-aluminum oxide stabilized with 4% $La_2O_3$, but not coated with precious metal, was created by constant stirring. In the next step, 10 kg/m³ (10 g/L) (with respect to the volume of the wall flow filter substrate to be coated (see step (b)) of powdered manganese(II) carbonate was added and the mixture ground in a ball mill until a $D_{99}$ value of <5 μm was reached.

With the coating suspension thus obtained, a commercially available wall-flow filter substrate of silicon carbide was coated as indicated in Example 1, step (b).

EXAMPLE 3

In order to prepare a coating suspension according to the invention, a suspension in water of 5 kg/m³ (5 g/L) (with respect to the volume of the wall-flow filter substrate to be coated (see step (b)) of a γ-aluminum oxide stabilized with 4% $La_2O_3$, which was coated with 0.53 kg/m³ (15 g/ft³) (with respect to the volume of the wall-flow filter substrate to be coated (see step (b)) of platinum and palladium in a 6:1 ratio, and 6 kg/m³ (6 g/L) (with respect to the volume of the wall-flow filter substrate to be coated (see step (b)) of the identical γ-aluminum oxide stabilized with 4% $La_2O_3$, but not coated with precious metal, was created by constant stirring. In the next step, 16 kg/m³ (16 g/L) (with respect to the volume of the wall-flow filter substrate to be coated (see step (b)) of powdered manganese(II) carbonate was added and the mixture ground in a ball mill until a $D_{99}$ value of <7 μm was reached. With the coating suspension thus obtained, a commercially available wall-flow filter substrate of silicon carbide was coated as indicated in Example 1, step (b). The target loading was 25.03 kg/m³ (25.06 g/L). A pH value of >8 was maintained, not only during the preparation of the coating suspension, but also during the coating process. The filter thus obtained is referred to below as K3.

Comparative Example 1

Example 3 was repeated with the difference that, instead of 16 kg/m³ (16 g/L) of powdered manganese(II) carbonate, 12 kg/m³ (12 g/L) of powdered manganese(IV) oxide was used.

The filter thus obtained is referred to below as VK1.

After the grinding process, the washcoat tubes of the ball mill were contaminated with a brown layer and had to be disposed of. In the case of Example 3, on the other hand, the washcoat tubes were still in very good condition and could continue to be used.

The catalytic activity of both filter VK1, prepared in the comparative example, and filter K3 from Example 3 was investigated, Before the investigation, the filters underwent artificial aging under hydrothermal conditions. To do so, they were exposed in an oven to a temperature of 800° C. for 16 hours in an atmosphere containing 10 vol % steam and 10 vol % oxygen in nitrogen. The ability to oxidize $H_2S$ catalytically to $SO_2$ under the conditions that may occur during the desulfurization of an upstream NOx storage catalytic converter was tested in a model gas test. To do so, in each case a system consisting of a commercially available NOx storage catalytic converter and a particulate filter directly downstream of it was sulfurized. The volumes of the NOx storage catalytic converter and particulate filter were identical in both systems. The selected quantity of sulfur was approx. 2.4 kg/m³ (2.4 of catalytic converter volume and was introduced by adding 300 vol.ppm $SO_2$ to the exhaust gas stream. In each case, a desulfurization with a catalytic converter inlet temperature of 600° C. was then simulated. Here, the air-fuel equivalence ratio λ was reduced to about 0.93 in 40 intervals of 8 seconds each by increasing the CO and HC concentrations (CO: 1.85 vol %; HC: 5700 vol.ppm) or by reducing the oxygen concentration in the exhaust gas stream (interval between these rich phases: 30 s).

Figure 2:
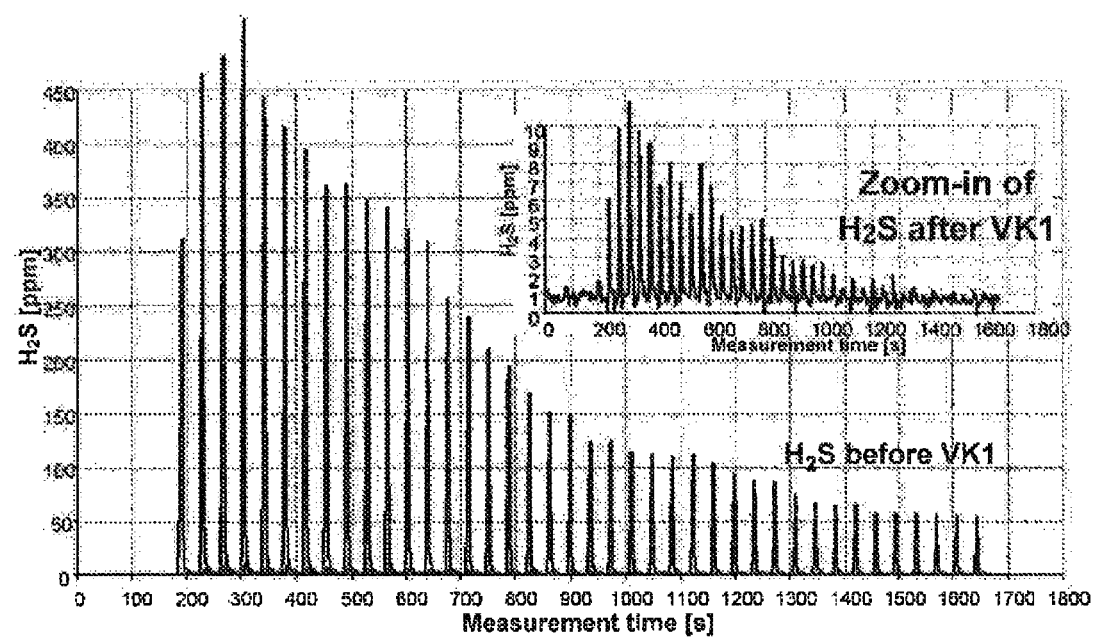
FIG. 2 shows the results of a test in which the effectiveness of filter VK1 as a hydrogen sulfide blocking catalytic converter, said filter being coated with a conventional coating suspension, was investigated.

The results are shown in FIG. 1 for filter K3 coated with a coating suspension according to the invention and in FIG. 2 for the comparison filter VK1. It is evident that the $H_2S$ concentration measured after filtering is considerably lower in the case of K1.

The invention claimed is:

1. A coating suspension comprising at least one platinum group metal on a support material, and manganese(II) carbonate in quantities of 3 to 20 kg/m³ (from 3 to 20g/L) with respect to the volume of a catalyst support substrate to be coated.

2. The coating suspension according to claim 1, comprising at least one of platinum, palladium, and rhodium as a platinum group metal.

3. The coating suspension according to claim 1, comprising platinum and palladium or platinum alone as platinum group metals.

4. The coating suspension according to claim 1, comprising platinum and palladium in ratio of 15:1 to 1:5 as platinum group metals.

5. The coating suspension according claim 1, comprising aluminum oxide, rare-earth doped aluminum oxide, silicon dioxide, titanium dioxide, cerium oxide, aluminum-silicon mixed oxides, cerium-zirconium mixed oxides or rare-earth doped cerium-zirconium mixed oxides as support material.

6. The coating suspension according to claim 1, comprising aluminum oxide stabilized with 1 to 6 wt % $La_2O_3$ as support material.

7. The coating suspension according to claim 1, comprising one or more zeolite compounds.

8. A coating suspension comprising at least one platinum group metal on a support material and manganese(II) carbonate, and one or more zeolite compounds selected from group consisting of zeolite β (zeolite beta), zeolite Y, ZSM-5, and mixture of two or more thereof.

9. The coating suspension according to claim 8, comprising at least one of platinum, palladium, and rhodium as a platinum group metal.

10. The coating suspension according to claim 8, comprising platinum and palladium or platinum alone as platinum group metals.

11. The coating suspension according to claim 8, comprising platinum and palladium in a ratio of 15:1 to 1:5 as platinum group metals.

12. The coating suspension according claim 8, comprising aluminum oxide, rare-earth doped aluminum oxide, silicon dioxide, titanium dioxide, cerium oxide, aluminum-silicon mixed oxides, cerium-zirconium mixed oxides, or rare-earth earth doped cerium-zirconium mixed oxides as support material.

13. A method for coating a catalyst support substrate with a coating having a hydrogen sulfide blocking function and an oxidation function, the method comprising bringing the catalyst support substrate into contact with a coating suspension containing at least one platinum group metal on a support material and manganese (II) carbonate, and then drying and calcining the catalyst support substrate.

14. The method according to claim 13, wherein a monolithic through-flow honeycomb structure made of ceramic or metal is used as the catalyst support substrate.

15. The method according to claim 13, wherein a ceramic through-flow honeycomb structure or a ceramic wall-flow filter substrate made of cordierite, aluminum titanate, or silicon carbide is used as the catalyst support substrate.

16. A coating suspension comprising at least one platinum group metal on a support material and manganese(II) carbonate, and wherein the coating suspension comprises aluminum oxide stabilized with 1 to 6 wt % $La_2O_3$ as support material.

17. The coating suspension according to claim 16, comprising one or more zeolite compounds selected from the group consisting of zeolite β (zeolite beta), zeolite Y, ZSM-5, and mixtures of two or more thereof.

18. The coating suspension according to claim 16, comprising platinum and palladium in a ratio of 15:1 to 1:5 as platinum group metals.

19. The method according to claim 13, wherein the coating suspension comprises manganese(II) carbonate in quantities of 3 to 20 kg/m³ (from 3 to 20 g/L) with respect to the volume of the catalyst support substrate to be coated.

20. The method according to claim 19, wherein the coating suspension comprises platinum and palladium or platinum alone as platinum group metals and one or more zeolite compounds.

* * * * *